No. 667,034. Patented Jan. 29, 1901.
W. H. PATTEN.
WHEEL HAY RAKE.
(Application filed Oct. 22, 1900.)
(No Model.) 2 Sheets—Sheet 1.
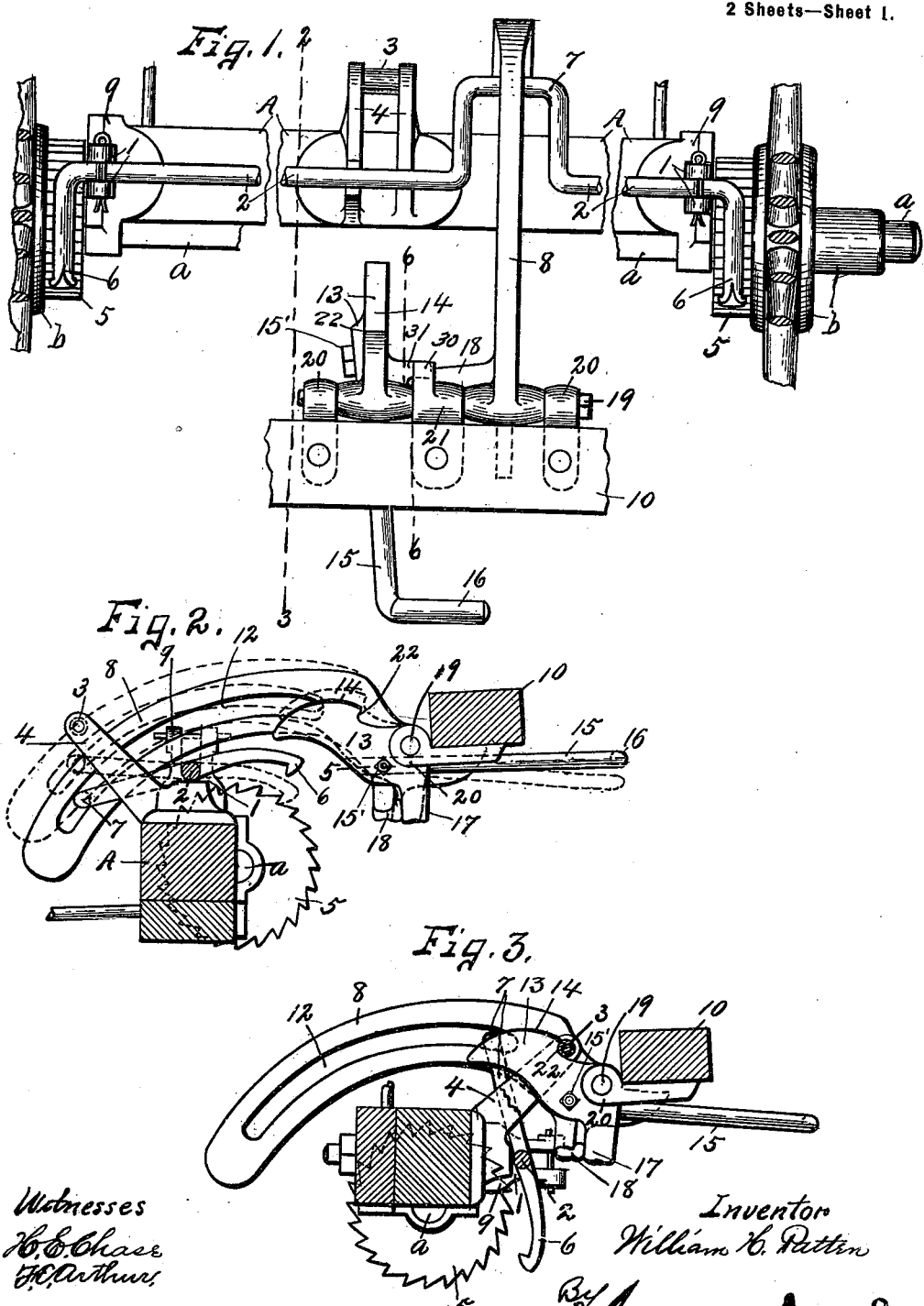
Witnesses
H. E. Chase
F. C. Arthur
Inventor
William H. Patten
By Smith & Davidson
attys.

No. 667,034. Patented Jan. 29, 1901.
W. H. PATTEN.
WHEEL HAY RAKE.
(Application filed Oct. 22, 1900.)
(No Model.) 2 Sheets—Sheet 2.
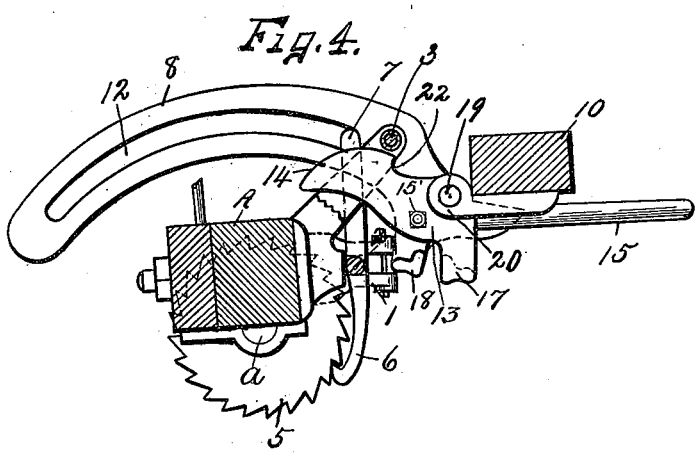
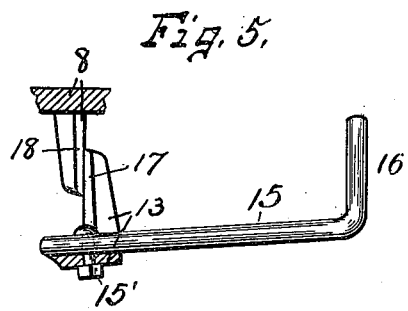
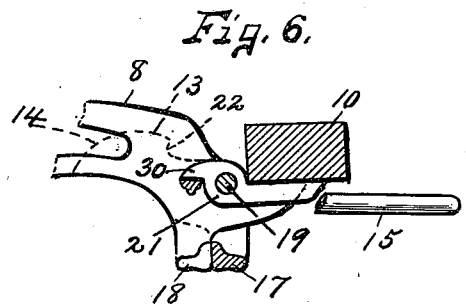
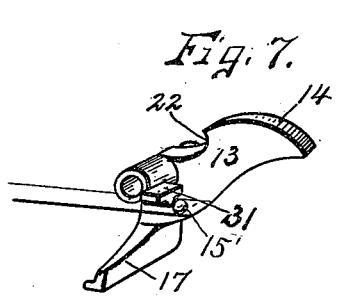
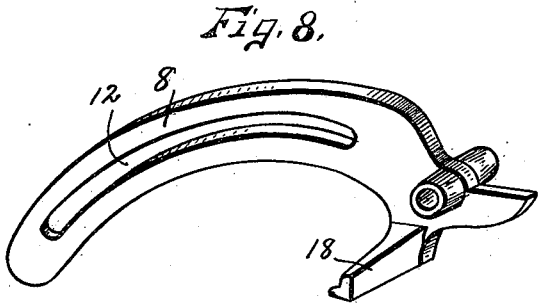
Witnesses:
H. E. Chase.
J. E. Arthur.
Inventor
William H. Patten
By
Smith & Davidson
Attys.

UNITED STATES PATENT OFFICE.

WILLIAM H. PATTEN, OF CANASTOTA, NEW YORK.

WHEEL HAY-RAKE.

SPECIFICATION forming part of Letters Patent No. 667,034, dated January 29, 1901.

Application filed October 22, 1900. Serial No. 33,844. (No model.)

*To all whom it may concern:*

Be it known that I, WILLIAM H. PATTEN, of Canastota, in the county of Madison, in the State of New York, have invented new and useful Improvements in Wheel Hay-Rakes, of which the following, taken in connection with the accompanying drawings, is a full, clear, and exact description.

This invention relates to wheel hay-rakes, and has for its object the production of a simple and practical device for elevating the teeth of the rake and holding the same in their elevated position when desired and for automatically releasing the ratchet-pawl when the teeth are held in their elevated position without liability of the reëngagement of the pawl with movable members of such means until the teeth are again lowered to their normal or operative position.

To this end the invention consists in the construction and arrangement of the component parts of a wheel hay-rake, as hereinafter more fully described, and pointed out in the claims.

Referring to the drawings, Figure 1 is a top plan view, partly broken away, of a portion of a wheel hay-rake embodying my invention. Figs. 2 and 3 are similar sectional views taken on line 2 3, Fig. 1, showing particularly the means for rocking the tooth-supporting bar and also the mechanism for controlling the movement of said bar, said tooth-supporting bar being shown in its normal operative position in Fig. 2 and as rocked to its inoperative position for elevating the teeth in Fig. 3, the locking member of the controlling mechanism being shown in Fig. 3 as engaged with a portion of the tooth-supporting bar for holding the same in its inoperative position. Fig. 4 is a sectional view similar to Figs. 2 and 3, showing the independently-movable controlling members in their position assumed just prior to the disengagement of the pawl with its ratchet for releasing the tooth-supporting bar. Figs. 5 and 6 are sectional views taken on line 5 5, Fig. 2, and line 6 6, Fig. 1. Figs. 7 and 8 are isometric views, respectively, of the detached controlling members for controlling the rocking movement of the tooth-supporting bar.

In devices of this character, in which the traction-wheels are provided with ratchets and the tooth-supporting bar is provided with pawls which are forced into operative engagement with the ratchets by means of a foot or hand lever for the purpose of rocking the tooth-supporting bar and thereby elevating the rake-teeth, means is usually provided for releasing the pawls from engagement with the ratchets when the teeth are elevated to the desired position, and the foot or hand lever is held in its operative position by the operator for holding the tooth-supporting bar in its inoperative position.

It has been demonstrated that owing to the jar of the wheel-rake in passing over obstructions and uneven surfaces and also the lack of sufficient strength the operator is frequently unable to hold the tooth-supporting bar in such inoperative position, and the pawls are more or less liable to move into and out of engagement with their respective ratchets, thereby causing undue noise and jar and increasing the liability of injury to the operating parts of the machine. In order to obviate these difficulties, I provide the rake with independently-movable members, one for forcing the pawls into and out of operative engagement with their respective ratchets for elevating and releasing the tooth-supporting bar, the other member being adapted to engage a portion of the tooth-supporting bar for holding the same in its inoperative position.

A represents a tooth-supporting bar having its opposite ends provided with axles a, upon which are journaled the hubs b of any desired form of traction-wheel. The tooth-supporting bar A may be of any desired form or construction and is provided at its opposite ends with bearings 1 for receiving a rocking bar 2, presently described. The intermediate portion of said bar A is provided with an engaging roller 3, which is mounted on a suitable pin secured to the outer ends of the separated arms 4, projecting from the upper face of the bar A. The axles a may also be of any desired form or construction and are preferably secured to the front face of the tooth-supporting bar A, with their axes arranged substantially coincident with said front face of said tooth-supporting bar. The hubs B of the traction-wheels are provided with ratchet-wheels 5, projecting inwardly from their inner faces, and are movable with said hubs independently of the tooth-supporting bar A. The opposite ends of the rocking bar 2 are journaled in the bearings 1 and are provided with pawls 6, movable into and out of engagement with the ratchet-wheels 5, and the intermediate portion of said bar 2 is provided with a substantially U-shaped crank-arm 7, which preferably projects in the opposite direction from the pawls 6 and is adapted to be engaged on an operating member 8, presently described, for moving the pawls 6 into and out of engagement with the ratchet-wheels 5. The bearings 1 for the rocking-bar 2 generally consist of separated ears projecting upwardly from brackets 9, which are secured to the opposite ends of the tooth-supporting bar A, said ears being united at their lower ends by a curved bearing-face and having their upper ends separated for permitting the insertion or removal of the rock-bar 2.

10 represents a cross-bar which is mounted on the thills or pole, (not illustrated,) said thills or pole being hinged in the usual manner to the tooth-supporting bar A and the cross-bar 10 being secured to said thills or pole and arranged substantially parallel with the tooth-supporting bar. The operating member 8, previously referred to, preferably consists of a curved arm having one end pivotally connected to the cross-bar 10 and its opposite end weighted and provided with a curved slot 12 for receiving the crank-arm 7 of the rock-bar 2, the upper and lower walls of said slot being adapted to engage said crank-arm as the rocking member 8 is raised or lowered for moving the pawls 6 into and out of engagement with the teeth of the ratchet 5.

The means for operating the bar 8 consists of an independently-movable arm 13, which is pivotally connected at one end to the cross-bar 10 and is provided with a curved bearing-face 14, arranged in the path of movement of the roller 3. This arm 13 is provided with a forwardly-projecting bar 15, having one end secured to the arm 13 by a suitable bolt 15' and the other end provided with a foot-engaging portion 16, whereby said arm 13 may be rocked upon its axis when desired and is also provided with a downwardly and laterally extending shoulder 17, adapted to engage a similar shoulder 18, projecting laterally from the arm 8 beneath its axis and at the rear of the shoulder 17.

As seen in the drawings, the arms 8 and 13 are arranged with their axes substantially coincident with each other and are mounted on a suitable pivotal bolt 19, which is supported in opposite and intermediate ears 20 and 21, secured to the cross-bar 10.

As previously stated, the shoulders 17 and 18 are arranged beneath the axes of movement of the arms 8 and 13, the shoulder 18 being arranged at the rear of the shoulder 17 for permitting the arms 8 and 13 to move in the opposite directions independently of each other.

The arm 13 is provided with a locking-shoulder 22, which is adapted to receive the engaging roller 3 of the tooth-supporting bar A for holding said tooth-supporting bar in its inoperative position when the foot-lever 15 is depressed.

The shoulders 17 and 18 are so relatively arranged that when the foot-lever 15 is depressed the shoulder 17 engages the shoulder 18 and rocks the free end of the arm 8 upon its pivot 19 for rocking the bar 2, and thereby forcing the pawls 6 into engagement with the ratchet-wheels 5. The traction-wheels, to which the ratchets 5 are secured, are then rotated forwardly for rocking the tooth-supporting bar A forwardly in the hubs B and moving the crank-arm 7 forwardly in the slot 12 of the arm 8. During this forward movement of the tooth-supporting bar the arms 8 and 13 are held in their elevated position by means of the foot-lever 15, the crank-arm 7 moves forwardly in the slot 12 and engages the forward end of the said slot, when the said tooth-supporting bar has been moved to the desired position, for releasing the pawls from engagement with their respective ratchets, and the shoulder 3 rides upon the curved face 14 of the arm 13, thereby depressing said arm and forcing the shoulder 17 away from the shoulder 18, so that when the shoulder 3 continues its forward movement toward the locking-shoulder 22 the pawls 6 are released from engagement with the ratchets 5, and the free end of the arm 8 is free to move downwardly for holding said pawls in their inoperative positions. The shoulder 22 and the adjacent end of the slot are so relatively arranged to each other that the crank-arm 7 engages said end of the slot 12 for releasing the pawls 6 at about the same time or just before the shoulder 3 registers with the shoulder 22. The continued downward pressure upon the foot-lever 15 operates to elevate the arm 13 when the shoulder 3 is registered with the shoulder 22, whereupon the said shoulder 3 readily interlocks with the shoulder 22 and serves to hold the tooth-supporting bar in its inoperative position.

The operation of my invention is as follows: When it is desired to elevate the teeth of the tooth-supporting bar A, the foot-lever 15 is depressed, thereby elevating the arm 8 and rocking the pawls 6 into engagement with their respective ratchets. The hay-rake being drawn forwardly, the traction-wheels and the ratchets secured thereto rock the tooth-supporting bar upwardly and forwardly until the crank-arm 7 engages the forward end of the slot 12 for releasing the pawls and the shoulder 3 interlocks with the shoulder 22. The tooth-supporting bar may be easily held in this position as long as desired by maintaining the lever 15 in its depressed position. As previously stated, just before the shoulder 3 interlocks with the shoulder 22 and is still resting upon the curved bearing-face 14 of the arm 13, Fig. 4, thereby separating the shoulders 17 and 18, the crank-arm 7 engages the forward end of the slot 12 and releases the pawls 6, and the arm 8 moves by gravity a limited distance, or until the shoulder 18 engages the shoulder 17, which operation of the arm 8 serves to force and hold the pawls 6 in their inoperative positions.

The intermediate bearing 21 on the cross-bar 10 is provided with a rearwardly-projecting stop-shoulder 30, which is arranged above and adapted to engage a similar stop-shoulder 31, provided on the inner face of the arm 13, for limiting the upward movement of said arm.

The operation of my invention will now be readily understood upon reference to the foregoing description and the accompanying drawings, and it will be noted that considerable change may be made in the detail construction and arrangement of the parts of my invention without departing from the spirit thereof. Therefore I do not limit myself to the precise construction and arrangement herein shown and described.

Having thus described my invention, what I claim, and desire to secure by Letters Patent, is—

1. A wheel-rake comprising a rocking tooth-supporting bar, a ratchet movable independently of said bar, a pawl connected to the bar and movable into and out of engagement with the ratchet, means for operating the pawl, and independently-movable means for controlling the movement of the former means and holding the bar in its inoperative position.

2. A wheel-rake comprising a rocking tooth-supporting bar, a ratchet movable independently of said bar, a pawl connected to the bar and movable into and out of engagement with the ratchet, means for operating the pawl, and independently-movable means for controlling the movement of the former means and holding the bar in its inoperative position, and a foot-lever secured to the latter means for actuating the same.

3. A wheel-rake comprising a rocking tooth-supporting bar, a wheel-actuated ratchet, a rock-bar mounted on the tooth-bar and provided with a crank-arm, a pawl movable into and out of engagement with the ratchet, an operating member, and means actuated by the operating member for moving the pawl and independent means for actuating the operating member and holding the tooth-bar in its elevated position.

4. A wheel-rake comprising a rocking tooth-bar having an engaging shoulder, means for rocking the bar, a support, and a rock-arm mounted on the support and provided with a shoulder arranged to interlock with the former shoulder for holding the teeth in their elevated position, said rock-arm being arranged to control the operation of said means.

5. A wheel-rake comprising a rocking tooth-bar having an engaging shoulder, means for rocking the bar, a support, a rock-arm mounted on the support and provided with a shoulder arranged to interlock with the former shoulder for holding the teeth in their elevated position, and a second rock-arm actuated by the former rock-arm for controlling the operation of said means.

6. A wheel-rake comprising a rocking tooth-bar having an engagement-shoulder, means for rocking the bar, a support, a rock-arm mounted on the support and provided with a bearing-face intersecting the arc of movement of said shoulder of the tooth-bar and terminating in a locking-shoulder, and a second rock-arm actuated by the former rock-arm for controlling the operation of said means.

7. A wheel-rake comprising a rocking tooth-bar, a ratchet and pawl for rocking the tooth-bar, a rock-arm for moving the pawl into and out of engagement with the ratchet and provided with an engaging face, a second rock-arm having an engaging face for engaging the face of the former arm and transmitting motion thereto, and means provided on the tooth-bar for separating said faces as the tooth-bar is rocked upwardly and permitting the former arm to move independently of the second arm for holding the pawl out of engagement with the ratchet.

8. A wheel-rake comprising a rocking tooth-bar, a ratchet and pawl for rocking the tooth-bar, a rock-arm for moving the pawl into and out of engagement with the ratchet and provided with an engaging face, a second rock-arm having an engaging face for engaging the face of the former arm and transmitting motion thereto, said second arm being formed with an inclined bearing-face, and a shoulder on the tooth-bar for engaging said inclined face and rocking the engaging face of the second arm away from the engaging face of the first arm as the tooth-bar is rocked upwardly for releasing the first arm and permitting the same to release the pawl; said inclined face terminating at one end in a locking-shoulder for engaging the shoulder of the tooth-bar and holding the same in its elevated position.

In witness whereof I have hereunto set my hand this 28th day of August, 1900.

WILLIAM H. PATTEN.

Witnesses:
H. E. CHASE,
HOWARD P. DENISON.